Nov. 22, 1932.  L. I. SANDERS  1,888,739
ICE CREAM DISHER
Filed Aug. 1, 1931   2 Sheets-Sheet 1

Inventor
Leo I. Sanders
By Clarence A. O'Brien
Attorney

Nov. 22, 1932.  L. I. SANDERS  1,888,739
ICE CREAM DISHER
Filed Aug. 1, 1931   2 Sheets-Sheet 2

Inventor
Leo I. Sanders

By *Clarence A. O'Brien*
Attorney

Patented Nov. 22, 1932

1,888,739

UNITED STATES PATENT OFFICE

LEO I. SANDERS, OF ESTHERVILLE, IOWA

ICE CREAM DISHER

Application filed August 1, 1931. Serial No. 554,541.

The present invention relates to a device for dishing or dispensing ice cream from an ice cream freezer container.

Another very important object of the invention resides in the provision of a device of this nature which permits the ready insertion of a stick in a portion of ice cream after the same has been dished from the freezer.

A still further very important object of the invention resides in the provision of a device of this nature which is exceedingly simple in its construction, easy to manipulate, thoroughly efficient and reliable in use, and inexpensive to manufacture and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 5 is a sectional view taken substantially on the line 5—5 of Figure 1 showing a stick inverted in the ice cream.

Figure 1:
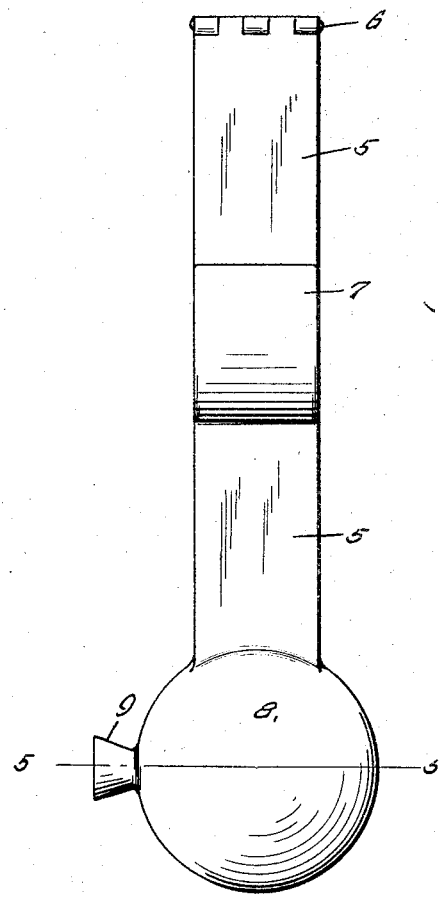
Figure 1 is a side elevation of the device embodying the features of my invention.
Figure 2:
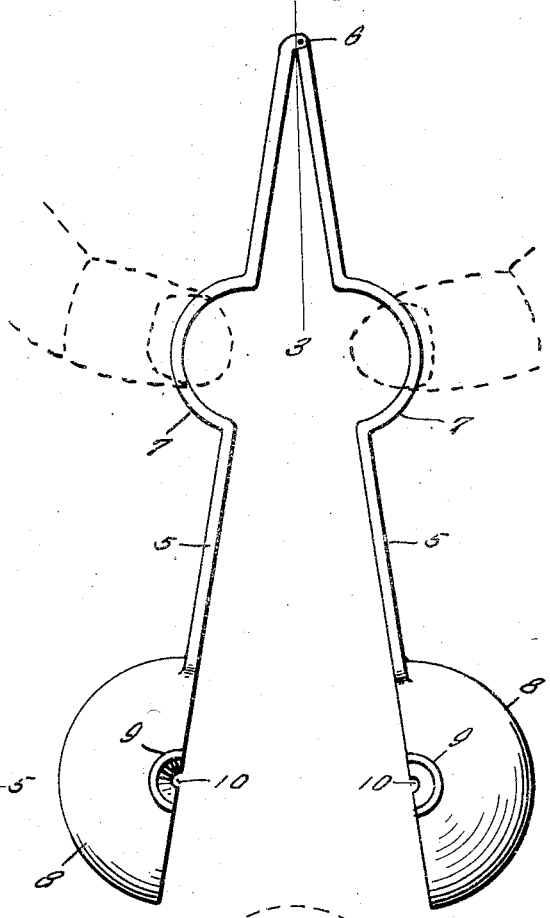
Figure 2 is an edge elevation thereof showing the device open.
Figure 3:
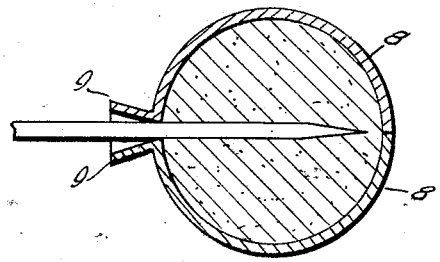
Figure 3 is a sectional view taken substantially on the line 3—3 of Figure 2.
Figure 3:
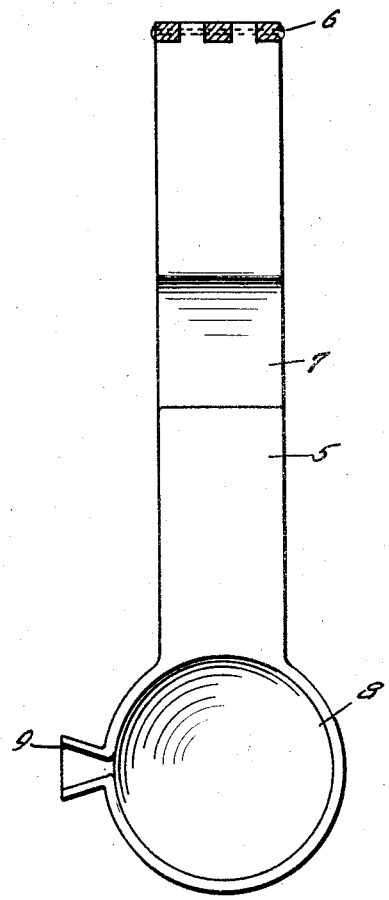
Figure 4:
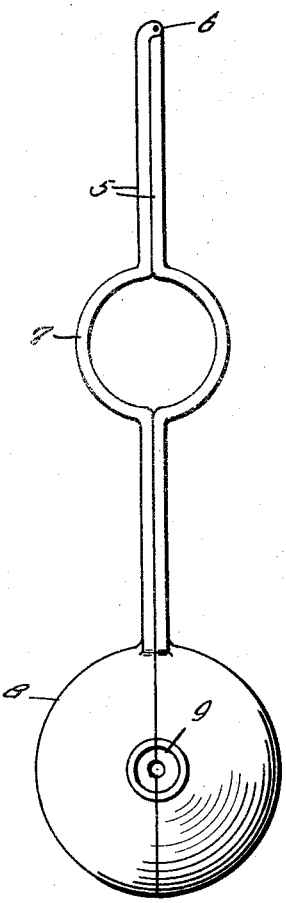
Figure 4 is an edge elevation of the device showing the same closed.

Referring to the drawings in detail it will be seen that numerals 5 denote a pair of elongated oblong plates hingedly connected together at adjacent ends as at 6 and having intermediate portions 7 curved outwardly in an arcuate manner. On the other end of these plates 6 are formed hollow semi-spherical cup like members 8 with funnel like sections 9 projecting therefrom to form a funnel when the members 7 are in abutting relationship or closed position.

Figure 6:
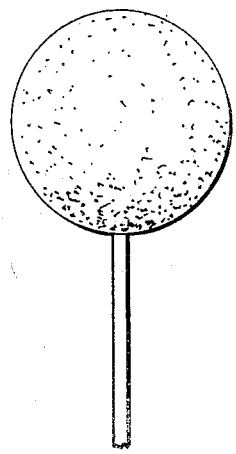
Figure 6 is a detail view of a ball of ice cream with a stick therein.

The edge of each member 8 is formed with a notch 10 adjacent the inner end of the section 9 and when these notches come together they form an opening as clearly illustrated in Figure 6.

It will be apparent that when the plates 5 are swung away from each other the two cup like members 8 may be forced down into the ice cream and then by swinging the plates 5 into abutment a ball of ice cream may be taken from the freezer and any desired stick may be inserted in the ice cream using the funnel sections as a guide. These cup like members 8 may be of any suitable shape. The arcuate portions 7 permit the plates to be swung to open position to empty the contents of the member 8.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A pair of elongated members having adjacent ends hingedly connected together for permitting said members to be brought into parallel contacting relation and the other ends having formed therein cup like members in opposed relationship, said cup like members being formed with registering notches at the edges thereof and opposed flaring sections projecting outwardly therefrom adjacent the notches and defining a gradually restricted entrance opening to the interior of said members, the elongated members being formed with outwardly offset arcuate portions intermediate their ends defining finger grips.

In testimony whereof I affix my signature.

LEO I. SANDERS.